United States Patent
Min

(10) Patent No.: US 8,375,898 B2
(45) Date of Patent: Feb. 19, 2013

(54) STORAGE TYPE BOILER HEATING EXCHANGING STRUCTURE FOR PREVENTING CONDENSATION

(75) Inventor: Tae-Sik Min, Seoul (KR)

(73) Assignee: Kyungdong Navien Co., Ltd., Pyoungtaek-Si (KR)

( * ) Notice: Subject to any disclaimer, the term of this patent is extended or adjusted under 35 U.S.C. 154(b) by 1019 days.

(21) Appl. No.: 12/307,915

(22) PCT Filed: Jan. 3, 2007

(86) PCT No.: PCT/KR2007/000028
§ 371 (c)(1),
(2), (4) Date: Jan. 7, 2009

(87) PCT Pub. No.: WO2008/007845
PCT Pub. Date: Jan. 17, 2008

(65) Prior Publication Data
US 2009/0308568 A1    Dec. 17, 2009

(30) Foreign Application Priority Data

Jul. 10, 2006 (KR) .......................... 10-2006-0064436

(51) Int. Cl.
*F24H 1/16* (2006.01)
(52) U.S. Cl. ..................................... 122/18.1; 122/18.31
(58) Field of Classification Search .................. 122/18.1, 122/18.2, 18.3, 18.31, 19.1, 31.1, 32, 59, 122/235.29; 165/47
See application file for complete search history.

(56) References Cited

U.S. PATENT DOCUMENTS

| | | | | |
|---|---|---|---|---|
| 1,585,945 A * | 5/1926 | Sweeney | ....................... | 122/17.2 |
| 4,203,392 A * | 5/1980 | McLane | ....................... | 122/18.3 |
| 4,393,815 A * | 7/1983 | Pedersen et al. | ............. | 122/31.1 |
| 5,233,970 A | 8/1993 | Harris | | |
| 5,546,760 A * | 8/1996 | Cook et al. | ....................... | 62/497 |
| 6,364,002 B1 * | 4/2002 | Hennig et al. | ................... | 165/10 |
| 6,666,173 B2 * | 12/2003 | Dick | ............................. | 122/18.4 |
| 7,258,080 B2 * | 8/2007 | Missoum et al. | ............. | 122/18.1 |
| 7,832,364 B2 * | 11/2010 | Liu | ............................... | 122/18.1 |
| 7,958,852 B2 * | 6/2011 | Kim | .............................. | 122/1 B |

FOREIGN PATENT DOCUMENTS

JP    58-11648    1/1983
(Continued)

OTHER PUBLICATIONS

English language ISR issued in PCT/KR2007/000028.
(Continued)

*Primary Examiner* — Gregory A Wilson
(74) *Attorney, Agent, or Firm* — Hershkovitz & Associates, LLC; Abraham Hershkovitz

(57) ABSTRACT

A heat exchanger of a non-condensing storage type boiler for preventing condensation is provided. The heat exchanger include a heating water outflow port installed on an upper portion of the boiler, a heating water inflow port installed lower than the heating water outflow port, and an internal pipe extending spirally from the heating water inflow port and being installed in a water tube of the boiler. The internal pipe is connected to an extension pipe that extends through a re-entry outlet passing through a wall of the boiler to be connected with a re-entry inlet.

12 Claims, 3 Drawing Sheets

FOREIGN PATENT DOCUMENTS

| | | |
|---|---|---|
| JP | 60-165759 | 11/1985 |
| JP | 62-200134 A | 9/1987 |
| JP | 1-91842 | 6/1989 |
| KR | 10-1995-0014828 | 6/1995 |
| KR | 10-1999-0007694 | 1/1999 |
| KR | 20-0223156 | 5/2001 |
| KR | 10-20030094942 A | 12/2003 |
| KR | 10-20040080571 A | 9/2004 |

OTHER PUBLICATIONS

English language Abstract of KR10-1995-0014828.
Japanese Office Action mailed Dec. 5, 2011 for Japanese Application No. 2009-519358.
English Language Abstract of KR-10-20030094942A.
English Language Abstract of KR-10-20040080571A.
English Language Abstract of JP-62-200134A.

* cited by examiner

| Temperature (Centigrade) | Present Invention | | Prior Art | |
| --- | --- | --- | --- | --- |
| | Heating Water Inflow Temperature | Heating Water Outflow Temperature | Heating Water Inflow Temperature | Heating Water Outflow Temperature |
| First Circulation | 20 | 30 | 20 | 30 |
| Second Circulation | 25 (re-entry Temperature) | 35 | 25 | 35 |
| Third Circulation | 30 (re-entry Temperature) | 40 | 30 | 40 |
| Fourth Circulation | 35 (re-entry Temperature) | 45 | 35 | 45 |
| Fifth Circulation | 40 (re-entry Temperature) | 50 | 40 | 50 |

FIG. 4

STORAGE TYPE BOILER HEATING EXCHANGING STRUCTURE FOR PREVENTING CONDENSATION

RELATED APPLICATIONS

This is an US National Phase Patent Application Under 35 USC §371 of International Patent Application No. PCT/KR2007/000028, filed on Jan. 3, 2007, which claims priority of Korean Patent Application No. 10-2006-0064436, filed on Jul. 10, 2006.

BACKGROUND OF THE INVENTION

1. Field of the Invention

The present invention relates, in general, to a heat exchanger of a storage type boiler, capable of preventing corrosion of the heat exchanger by greatly reducing the generation of condensate water on the outer surface of the heat exchanger in the storage type boiler.

2. Discussion of Background Information

A boiler is defined as an apparatus for boiling water in order to supply hot water to a heating facility or a bath. In brief, the boiler is a device for boiling water, and can be divided into two types: one for industrial use and the other for household use.

Typically, a household boiler is a low-capacity boiler used below boiling point, whereas an industrial boiler is a high-capacity boiler used above boiling point. Other, additional devices are required for use above the boiling point, and thus increase the size of equipment. For this reason, most household boilers using relatively little thermal energy can heat water to below the boiling point.

Further, boilers are classified as condensing type boilers and non-condensing type boilers, according to whether or not condensing is carried out.

The condensing type boiler emits thermal energy in a process in which steam, generated by the combustion of gas, is converted into water ($H_2O$) upon contact with lower temperature objects or air, and employs a system that is designed to recover the thermal energy to increase thermal efficiency. The condensing type boiler can obtain thermal efficiency between 103% and 108% on the basis of a net caloric value, and thus is a type of boiler that reduces fuel costs remarkably. This condensing type boiler can have high thermal efficiency, but cannot prevent the generation of condensate water. Hence, the condensing type boiler is produced using material that has high corrosion resistance on heat transfer surfaces of the boiler. Typically, material having high corrosion resistance has low heat transfer efficiency, so that the heat transfer area of the boiler must be increased in order to guarantee heat transfer efficiency, and thus an increase in the size of the boiler must be tolerated.

The non-condensing type boiler, compared to the condensing type boiler, is free from condensation, so it has an advantage in that it can be reduced in size by using material characterized by relatively efficient heat transfer. However, because materials exhibiting relatively good heat transfer efficiency are not efficiently resistant to the corrosive effects of condensate water, the non-condensing type boiler shows a tendency toward a rapid decrease in lifespan due to the condensate water generated when operation is commenced.

Ideally, the non-condensing type boiler does not generate any condensate water.

However, this is impossible in practice because a boiler is not operated at all times. Therefore, an alternative construction in which relatively less condensate water is generated is necessary in order to prolong the lifespan of the boiler.

FIG. 1 illustrates the structure of a regular heat exchanger in a conventional storage type boiler. The regular heat exchanger is provided with a combustion chamber to which a burner is attached at an upper or lower portion thereof, and a plurality of fire tubes. An exhaust gas that is burned transfers heat to water through the wall of each fire tube while the gas passes through the plurality of fire tubes, and is discharged to the outside through an exhaust flue (not shown). The burned exhaust gas contains a large quantity of water vapor ($H_2O$), which is condensed into water when contacting an object that is cooler than a dew point temperature.

The dew point temperature is dependent on the percentage of water vapor in the exhaust gas. In the state of ordinary combustion, the dew point temperature is in the range of 40° C. to 47° C. in the case of oil fuel, and of 50° C. to 57° C. in the case of gas fuel. If the heating water is at an inflow temperature of 20° C. and an outflow temperature of 40° C. when heated by the heat exchanger, the water in the heat exchanger has an overall temperature under the dew point temperature, and thus a condensation phenomenon rapidly occurs on the wall of each fire tube. In the case in which a user has been absent, when operation of the boiler again is initiated, water is mostly circulated at a temperature below 20° C. Hence, in the case in which this condensation phenomenon is repeatedly generated, moisture, when condensed, reacts with sulfur oxides (in the case of oil fuel) or nitrogen oxides (in the case of gas fuel), so that acid condensate water between pH 2 and pH 4 is formed. As the temperature in the boiler is gradually increased, the moisture of the acid condensate water evaporates, leaving only the sulfur oxides or the nitrogen oxides. As the condensation phenomenon is repeated, the acid condensate gradually adheres to the surface of the boiler. The acid condensate causes the heat exchanger to gradually corrode and become less durable. Ultimately, due to the acid condensate water, the boiler can no longer be used.

Typical materials for the heat exchanger include iron, copper, and the like. These metals are very vulnerable to corrosion caused by the condensate water. Hence, when the boiler is used for some time, corrosion occurs. Of course, the heat exchanger can be produced using a special material such as aluminum alloy or stainless steel, so as to withstand the condensate water. In the case in which such a special material is used, production and operation are difficult, and the size, weight and cost of the product are increased. Further, these special materials have relatively low heat transfer efficiency, compared to copper.

For this reason, a heat exchanger capable of preventing damage as well as having improved durability despite being made of typical material, because it prevents or minimizes the condensation phenomenon, is required.

SUMMARY OF THE INVENTION

In order to accomplish the above object, according to an aspect of the present invention, there is provided a heat exchanger of a storage type boiler for preventing condensation, which has improved durability and which can prevent or minimize the condensation phenomenon in spite of being constructed of typical material.

According to one embodiment of the present invention, the heat exchanger prevents damage due to strong acid components, and has increased durability. In this embodiment, moisture contained in a gas formed by the burning of fuel (gas or oil) is condensed at the heat exchanger of the boiler, poisonous gases (e.g. sulfur oxides, nitrogen oxides, etc.) contained in the burned gas are dissolved in the condensate water, and the condensate water is subjected to evaporation of the moisture alone, leaving behind the strong acid components, as the temperature at the surface of the boiler is increased.

According to another embodiment of the present invention, the structure of the heat exchanger can increase durability by preventing the corrosion caused by condensation even when the heat exchanger is produced using an ordinary material (iron or copper), and can also minimize the corrosion caused by condensate water even when the heat exchanger is produced using a special material (aluminum alloy or stainless steel).

According to the present invention, there is provided a heat exchanger of a non-condensing storage type boiler for preventing condensation. The heat exchanger includes a water outflow port installed on an upper portion of the boiler, a water inflow port installed lower than the outflow port, and an internal pipe extending spirally from the inflow port. The internal pipe is installed in a water tube of the boiler and connected to an extension pipe, the extension pipe extending through a re-entry outlet passing through a wall of the boiler and connected to a re-entry inlet.

BRIEF DESCRIPTION OF THE DRAWINGS

The present invention is illustrated in the accompanying drawings, in which:

FIG. 4 is a table representing the differences between the present invention and the conventional art.

DETAILED DESCRIPTION OF PREFERRED EMBODIMENTS

Hereinafter, an exemplary embodiment according to the invention will be described in detail with reference to the accompanying drawings.

Figure 1:
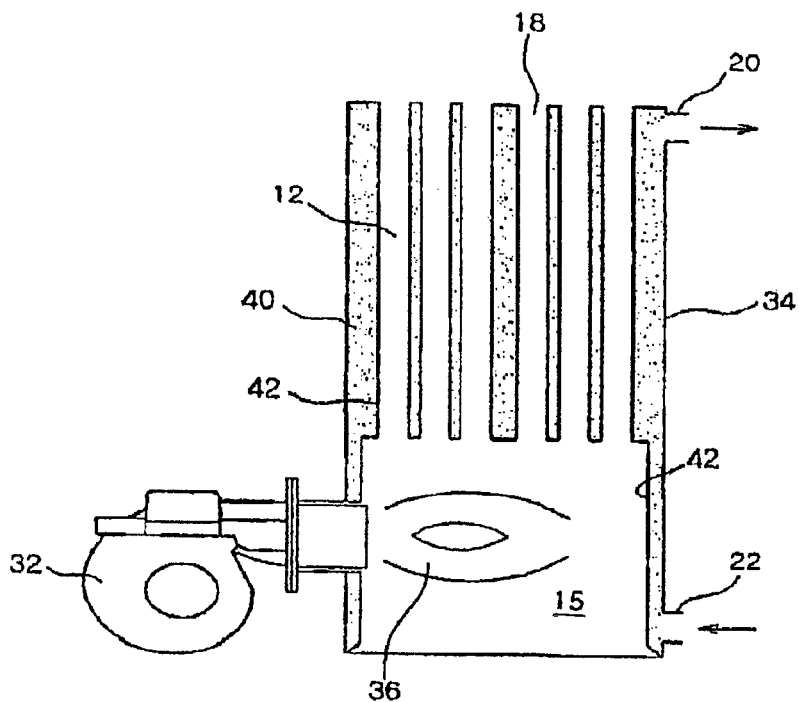
FIG. 1 illustrates the structure of a regular heat exchanger in a conventional storage type boiler.
Figure 2:
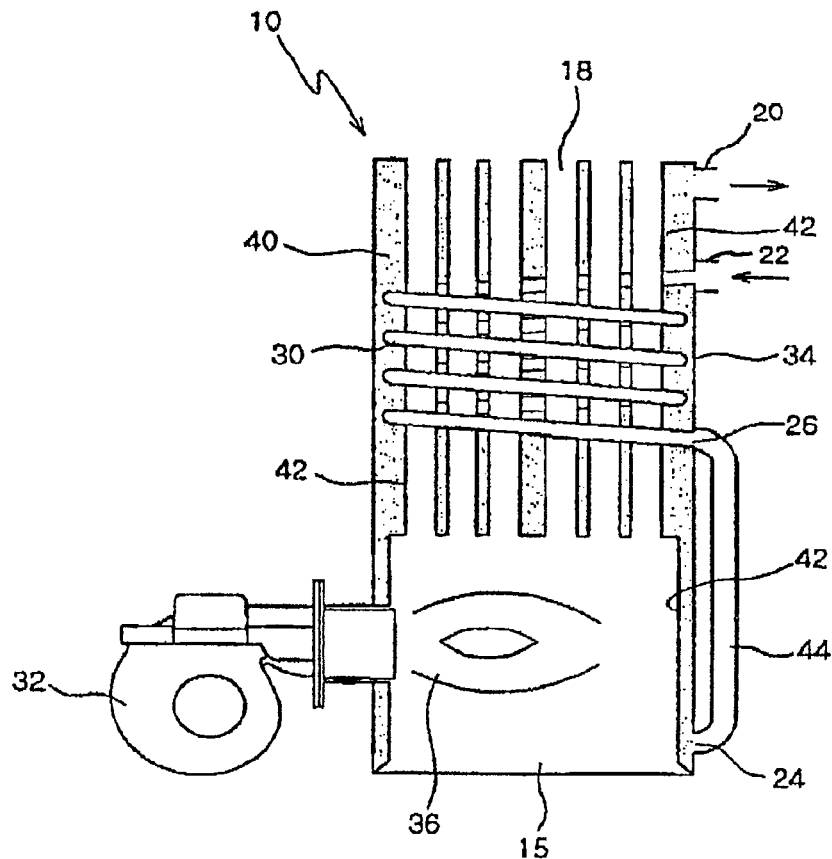
FIG. 2 illustrates the structure of a heat exchanger in a storage type boiler according to one embodiment of the present invention.
Figure 3:
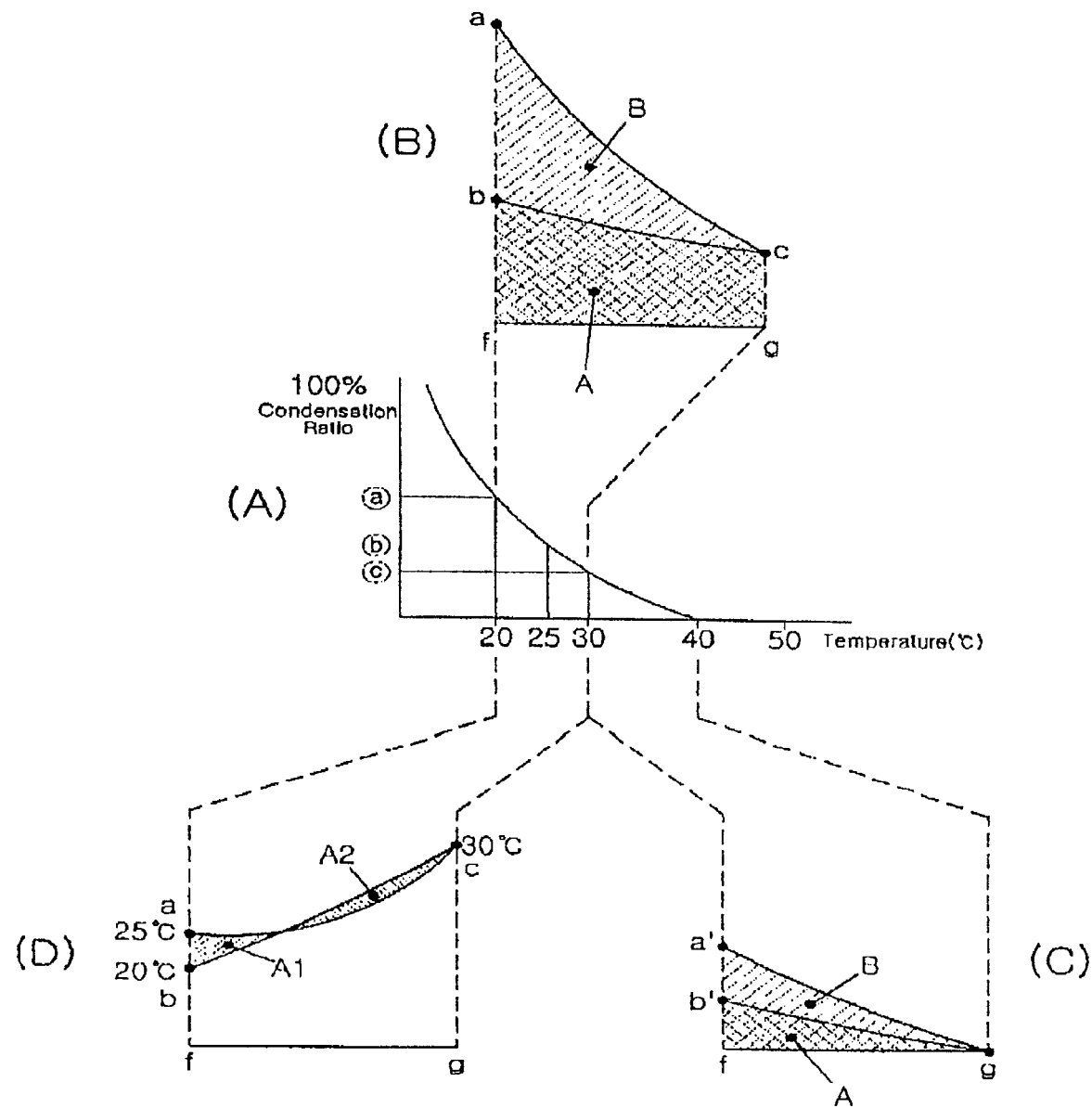
FIG. 3 is a comparative graph illustrating the effects according to the present invention.

FIG. 1 illustrates the structure of a regular heat exchanger in a conventional storage type boiler. FIG. 2 illustrates the structure of a heat exchanger in a storage type boiler according to the present invention. FIG. 3 is a comparative graph illustrating the effects according to the present invention. FIG. 4 is a table representing the temperature differences between water heated by the present invention and water heated by conventional art.

FIG. 1 illustrates the structure of a regular heat exchanger of a conventional storage type boiler, including a burner 32 igniting gases 36 in combustion chamber 15. The burned gases are exhausted from combustion chamber 15 through openings 18 in fire tubes 12 to an exhaust flue (not shown). As hot gases pass through fire tubes 12, they heat the walls of water tubes 40, and the water contained therein. During the condensate phenomenon, a mixture of condensate water and exhaust gas oxides collects on the boiler surfaces 42, with corrosive results. A detailed description of FIG. 1 already has been made in the discussion of the background art hereinabove.

FIG. 2 illustrates the structure of a heat exchanger of a storage type boiler according to the present invention, in which a coil type pipe 30 is fitted in a water tube 40 of the heat exchanger of a regular storage type boiler 10.

In the heat exchanger of a non-condensing storage type boiler of the present invention, as shown in FIG. 2, a heating water outflow port 20 is formed in an upper portion of boiler 10, and a heating water inflow port 22 is formed in a position lower than the heating water outflow port 20. An internal pipe 30 extending spirally from the heating water inflow port 22 is installed in a water tube 40 of boiler 10, and is connected to an extension pipe 44. Extension pipe 44 connects with pipe 30 through a re-entry outlet 26, which passes through wall 34 of the boiler. Pipe 44 then is connected with a re-entry inlet 24, which allows water from pipe 44 to enter water tube 40. The pipe 30 is spaced apart from the wall 34 of the boiler by a predetermined distance when installed in the water tube 40 of the boiler 10.

The extension pipe 44 is thermally isolated in order to prevent heat of the heating water from being emitted to the outside.

Inflow water to be heated is introduced into port 22 located at an upper portion of the storage type heat exchanger of the present invention, enters the spiral pipe 30 where it is heated by the heat of the water in tube 40, flows out of re-entry outlet 26 installed in the lower portion of the heat exchanger along an internal channel of the spiral pipe 30, flows through extension pipe 44, and then is introduced into the re-entry inlet 24 at the lower portion of the heat exchanger and enters water tube 40.

The outflow port 20 is located at the upper portion of the heat exchanger so that the water heated at the lower portion of the heat exchanger flows out of a heating water feed pipe (not shown) installed in the upper portion of the heat exchanger, and is supplied to piping in the floor or in a radiator. Thus, the heating of the floor or a radiator is performed.

Although the inflow water to be heated is introduced into pipe 30 at a lower temperature than the dew point, it enters first into the heated heat exchanger without directly contacting the wall of a fire tube, and is subject to hot-water-based heating. Thus, when the inflow water enters water tube 40 in contact with the fire tube 12, it already has received initial heating, so that a condensation phenomenon can be prevented.

This novel configuration functions to heat the inflow water, introduced at a low temperature, by a hot-water-based heating mode to relatively reduce the amount of condensate water generated on the heat exchange surfaces 42 of boiler 10 with high efficiency. The lower the temperature that the inflow water becomes, the more condensate water is generated. Thus, as the temperature of the water in contact with exhaust gas is increased, the further the condensation phenomenon is reduced.

The present invention will be described in greater detail with reference to FIGS. 3 and 4.

FIG. 3 is a comparative graph illustrating the effects of the novel features according to the present invention, in which (A) illustrates the condensation rate in terms of temperature, (B) illustrates how much condensation is generated in the conventional art when compared with the present invention, (C) illustrates how much condensation is generated in the case of a fourth cycle in the conventional art when compared with the present invention, and (D) illustrates the internal temperature gradient of a boiler 10 in the conventional art when compared with the present invention.

FIG. 4 is a table representing the temperature differences between the present invention and the conventional art, in which the temperatures of the heating water outflow port 20 and heating water inflow port 22 of a boiler 10 are compared to each other in the case in which a burner 32 of the boiler 10 of the present invention has the same capacity as that of the conventional art, and heating water heats the space and/or the floor with the same heat, and then flows back to the boiler 10.

The differences between the present invention and the conventional art will be described with reference to FIGS. 3 and 4.

In the table of FIG. 4, the boiler 10 of the present invention has the same capacity, the same rpm of a circulating pump, and the same temperature of hot water, when the heating water flows out of the heating water outflow port 20, carries out work (heating), and then flows to the heating water inflow port 22, as a typical boiler does in the conventional art.

In light of the structures of the boilers 10 illustrated in FIGS. 1 and 2, the quantity of water in the boiler 10 of FIG. 2 is little more than that of FIG. 1, because the pipe is installed in the boiler 10 of FIG. 2. However, assuming that the volume of the pipe installed in the boiler of FIG. 2 is small, and thus the boilers 10 of FIGS. 1 and 2 contain the same quantity of water, the inflow heating water flowing back to the boiler 10 of FIG. 2 transmits the same thermal energy as that of FIG. 1 in order to increase the temperature. The table of FIG. 4 will be described under the condition that typical burners 32, capable of increasing the temperature at the inlet by about 10° C., are used.

In FIG. 4, the heating water inflow port and the heating water outflow port of the present invention are compared to those of the conventional art with respect to temperature. The respective cycles are divided at regular intervals of time, and the temperatures at each time point are compared to each other. In the first cycle, the inflow heating water of the boiler 10 in the conventional art has a temperature of 20° C., and the burner 32 of the boiler 10 has a capacity capable of increasing the temperature by 10° C., so that the temperature of the heating water outflow port reaches 30° C., and the heating water flows out. When compared to the conventional art, the present invention is identical in that heating water having a temperature of 20° C. flows to the heating water inflow port 22, and in that the temperature of the heating water outflow port is 30° C., but is different in that the inflow heating water is subject to hot-water-based heating through the pipe 30 that is coiled in the boiler 10, and thus is increased to a temperature of 25° C. when re-entering the re-entry inlet 24 at the lower portion of the boiler 10.

The re-entry temperature can be regarded as a broad temperature range in which the temperature of the re-entry inlet 24 is kept higher than the temperature of the heating water inflow port 22, and lower than the temperature of the heating water outflow port 20, by allowing the thermal energy corresponding to area A1, shown in (D) of FIG. 3, to be transmitted from the water tube 40 of the boiler 10 to the internal pipe 30 by the thermal energy corresponding to area A2, and thus causing the hot-water-based heating. This is because the re-entry temperature is dependent on the state, thickness, number of turns, position, etc. of the internal pipe 30.

In the second cycle, because one unit of time has lapsed, all of the heating water in the boiler 10 has completed the first cycle. In this process, the heating water flowing out at a temperature of 30° C. flows in at a temperature lowered by 5° C., i.e., at a temperature of 25° C., because the temperature difference of 5° C. is used to heat the space and/or the floor. This inflow temperature difference of 5° C. is the same between the present invention and the conventional art. The heating water in the conventional art flows out at a temperature of 35° C., which is an increase of 10° C. when compared to the temperature of 25° C. of the inflow heating water. In contrast, the heating water in the present invention is subject to the hot-water-based heating to have a re-entry temperature of 30° C., so that the quantity of condensate water formed on the inner surfaces of the boiler 10 is relatively reduced.

In the third cycle, because one unit of time has lapsed, all of the heating water in the boiler 10 has completed the second cycle. In this process, the heating water flowing out at a temperature of 35° C. flows in at a temperature lowered by 5° C., i.e., at a temperature of 30° C., because the temperature difference of 5° C. is used to heat the space and/or the floor. This inflow temperature difference of 5° C. is the same between the present invention and the conventional art. The heating water in the conventional art and the present invention flows out at a temperature of 40° C., which is an increase of 10° C. over the temperature of 30° C. of the inflow heating water, due to the heat from the burner 32 installed in the boiler 10. With regard to the temperature of the inflow heating water, the inflow heating water in the present invention is subjected to hot-water-based heating to have a re-entry temperature of 35° C., so that the quantity of condensate water formed on the inner surfaces of the boiler 10 is relatively reduced.

In the fourth cycle, because one unit of time has lapsed, all of the heating water in the boiler 10 has completed the third cycle. In this process, the heating water flowing out at a temperature of 40° C. flows in at a temperature lowered by 5° C., i.e., at a temperature of 35° C., because the temperature difference of 5° C. has been used to heat the space and/or the floor. This inflow temperature difference of 5° C. is the same between the present invention and the conventional art. The heating water in the conventional art and the present invention flows out at a temperature of 45° C., which is an increase of 10° C. over the temperature of 35° C. of the inflow heating water, due to the heat of the burner 32 installed in the boiler 10. With regard to the temperature of the inflow heating water, the inflow heating water in the present invention is subjected to hot-water-based heating to have a re-entry temperature of 40° C., so that condensation is no longer generated on the inner surface of the boiler 10. The prerequisite condition sets 40° C. as the temperature at which no condensation is generated, i.e., a surrounding dew point temperature is less than 40° C. However, the conventional boiler 10 still suffers from condensation.

Comparing respective cycles, the conventional art is subject to condensation up to the fourth cycle, and the present invention is subject to condensation up to the third cycle Thus, the present invention can reduce the time during which condensation is generated by at least 25%. Furthermore, the reduction of the time during which condensation is generated decreases corrosion in the boiler 10, and thus acts as an important factor that prolongs the lifespan of the boiler 10. This is because the quantity of oxides adhered to the inner surfaces of the boiler 10 is increased in proportion to the time during which condensation is generated.

In the fifth cycle, because one unit of time has lapsed, all of the heating water in the boiler 10 has completed the fourth cycle. In this process, the heating water flowing out at a temperature of 45° C. flows in at a temperature lowered by 5° C., i.e., at a temperature of 40° C., because the temperature difference of 5° C. was used to heat the space and/or the floor. This inflow temperature difference of 5° C. is the same between the present invention and the conventional art. The heating water in the conventional art and the present invention flows out at a temperature of 50° C., which is an increase of 10° C. over the temperature of 40° C. of the inflow heating water, due to the heat of the burner 32 installed in the boiler 10. With regard to the temperature of the inflow heating water, the inflow heating water in the present invention is subjected to hot-water-based heating to have a re-entry temperature of 45° C., whereas the inflow heating water in the conventional art has a temperature of 40° C. As a result, neither the conventional art nor the present invention generates condensation on the surface of the boiler 10.

In the table of FIG. 4, the prerequisite condition sets 40° C. as the temperature at which no condensation is generated, but in actuality, condensation can be generated at temperatures higher than 40° C. Further, it is assumed that the temperature difference of 5° C., relative to the temperature of the outflow heating water, is used to heat the space and/or the floor. This is applied to the case in which heat for heating is required for a long time. However, in the steady state, less thermal energy is required.

Further, the re-entry temperature has been described as being increased by 5° C. compared to the temperature of the inflow heating water. However, the re-entry temperature is dependent on the shape of the internal pipe 30 of FIG. 2 when increased by the hot-water-based heating. Other factors capable of changing the increase in the reentry temperature by the hot-water-based heating include the number of turns, diameter, thickness, and heat transfer efficiency of the internal pipe, as well as the capacity of the circulating pump.

FIG. 3 illustrates the effects according to the present invention, and is a graph expressing how much condensation is generated according to temperature when the dew point temperature is less than 40° C. It can be seen that the lower the temperature, the more condensation is generated.

In the first cycle, when the temperature of the inflow heating water reaches 20° C., the rate of formation of condensate water on the surfaces of the heat exchanger approaches 60%. When the temperature of the inflow heating water reaches 25° C., the rate of formation of condensate water on the surface of the heat exchanger approaches 30%. When the temperature of the inflow heating water reaches 30° C., the rate of formation of condensate water on the surface of the heat exchanger approaches 20%. This can be seen in section (A) of the graph.

Section (A) of FIG. 3 shows that the condensation rate in terms of the quantity of condensate water formed in the boiler 10 depends on the inflow water temperature, and the point f in section (B) of FIG. 3 shows how much condensation is generated on the heat exchanger surfaces of the boiler 10 in a lower portion of the boiler 10 where the inflow heating water flows in, and the point g shows how much condensation is generated on the heat exchanger surfaces of the boiler 10 at an upper portion of the boiler 10 where the feed heating water flows out. The quantity of condensate water formed on the inner surfaces of the conventional boiler 10 can be compared with that formed on the inner surfaces of the inventive boiler 10.

The quantity of condensate water formed on the surfaces of the conventional boiler 10 can be expressed as an area afgc, whereas the quantity of condensate water formed on the surfaces of the inventive boiler 10 can be expressed as an area bfgc. Therefore, it can be seen that the inventive boiler 10 can remarkably reduce the quantity of condensate water.

Further, in addition to the remarkable reduction in condensate water, an important factor is the quantity of condensate water that is intensively formed in specific portions. As can be seen from the graph of section (B) of FIG. 3, the condensation water formed on the surfaces of the conventional boiler 10 is concentrated at the lower portion of the boiler 10, where the inflow heating water flows in. The quantity of condensate water increases the likelihood of the presence of various dissolved acids, which are contained in the burned exhaust gas of the boiler 10, to convert them into strong acid. The boiler 10 by nature is repeatedly driven and stopped. Hence, if a certain portion is corroded, and a hole is formed by the accumulation of acid, it becomes difficult to use the boiler 10. Therefore, it can be seen that the lifespan of the boiler 10 can be considerably reduced.

In addition, most boilers cannot be used if corrosion occurs in the lower portion thereof. In order to prevent such corrosion, a material having high corrosion resistance is used for the lower portion of the boiler, which leads to reduced heat transfer efficiency. For this reason, the size of the boiler 10 must be increased.

In comparison of the quantity of condensate water formed on the inner surfaces of boilers, it can be seen that the quantity of condensate water in the present invention is about half that of the conventional art. This means that the lifespan of the inventive boiler 10 can be increased by about two times.

Section (C) of the graph of FIG. 3 explains the case of the third cycle. The quantity of condensate water formed on the surfaces of the conventional boiler 10 can be expressed as a'fg, and the quantity of condensate water formed on the surfaces of the inventive boiler 10 can be expressed as b'fg. Thus, it can be seen that the quantity of condensate water formed on the surfaces of the inventive boiler 10 is only half that of the conventional boiler. Thus, the lifespan of the inventive boiler 10 can be doubled again.

The graph of section (D) of FIG. 3 shows the temperature gradient of the inner surfaces of each of the conventional and inventive boilers 10. The temperature gradient of the conventional boiler shows that the temperature of 20° C. is increased to the temperature of 30° C. by heating the burner 32 of the boiler 10, and that the temperature gradient of the inventive boiler forms a curved line rather than a straight line (which is not exactly a straight line, but is simplified), because the heat is transmitted to the internal pipe for the hot-water-based heating, although the increase up to the temperature of 30° C. by means of the capacity of the burner 32 is the same as in the conventional boiler. In the inventive boiler, because an area A1 must be substantially equal to an area A2, the area A1 corresponds to the thermal energy transmitted to the inflow heating water through the internal pipe 30 while the inflow heating water is subjected to the hot-water-based heating, and the area A2 corresponds to the thermal energy which the inflow heating water gets from the heating water in tube 40 around the internal pipe 30, to thus undergo an increase of 5° C.

Further, the thermal energy transmitted from the burner 32 in the conventional boiler 10 is substantially equal to that transmitted from the burner 32 in the inventive boiler 10, and thus it can be found that the area defined by afgc is substantially equal to the area defined by bfgc.

Although the present invention has been described taking a boiler 10 for heating a space and/or a floor by way of example, the same structure may be applied to a boiler for heating water.

Further, the given conditions have been described as being simplified in an ideal state. However, it is apparent that the actual temperature can be slightly higher than the calculated temperature due to the combustion gas in the boiler, and thus the quantity of condensate water can be relatively reduced.

According to the present invention, the heat exchanger can be prevented from being damaged by strong acid components, and can thus be increased in durability, wherein water vapor contained in a gas formed by the burning of fuel (gas or oil) is condensed at the heat exchanger of the boiler 10, poisonous gases (e.g. sulfur oxides, nitrogen oxides, etc.) contained in the burned gas are dissolved into the condensate water, and evaporation of the condensate water and thus deposition of the strong acid components takes place due to the increase in the temperature of the boiler.

Further, the durability of the heat exchanger can be increased by preventing corrosion caused by condensation even when the heat exchanger is made of an ordinary material (iron or copper), and the corrosion of the heat exchanger caused by condensate water also can be minimized when the heat exchanger is made of a special material (aluminum alloy or stainless steel).

The invention claimed is:

1. A heat exchanger of a non-condensing storage type boiler for preventing condensation, the heat exchanger comprising:
   a heating water outflow port installed in an upper portion of the boiler;
   a heating water inflow port installed in a position lower than the heating water outflow port; and
   an internal pipe extending spirally from the heating water inflow port and installed in a water tube of the boiler, the internal pipe being connected to an extension pipe that extends through a re-entry outlet passing through a wall of the boiler and the extension pipe being connected with a re-entry inlet.

2. The heat exchanger according to claim 1, wherein the internal pipe is spaced apart from the wall of the boiler by a predetermined distance when installed in the water tube of the boiler.

3. The heat exchanger according to claim 2, wherein the internal pipe is subjected to hot-water-based heating by transmission of thermal energy from the water tube of the boiler to the internal pipe, thereby causing a temperature of the re-entry inlet to be higher than a temperature of the heating water inflow port and to be lower than a temperature of the heating water outflow port.

4. The heat exchanger according to claim 3, wherein a quantity of condensate water formed at the lower portion of the boiler is decreased in a first cycle when the boiler is initially driven.

5. The heat exchanger according to claim 4, wherein the extension pipe is thermally isolated in order to prevent heating water heat from being emitted outside.

6. The heat exchanger according to claim 5, wherein a time when the condensation is continuously generated in the lower portion of the boiler is decreased by 25% when compared to a boiler having the same features of the heat exchanger without the internal pipe.

7. The heat exchanger according to claim 4, wherein a time when the condensation is continuously generated in the lower portion of the boiler is decreased by 25% when compared to a boiler having the same features of the heat exchanger without the internal pipe.

8. The heat exchanger according to claim 3, wherein a time when the condensation is continuously generated in the lower portion of the boiler is decreased by 25% when compared to a boiler having the same features of the heat exchanger without the internal pipe.

9. The heat exchanger according to claim 3, the thermal energy transmitted from the water tube corresponds to an area A1, which is equal to a thermal energy corresponding to an area A2 which an inflow heating water gets from a heating water in the water tube.

10. The heat exchanger according to claim 2, wherein a time when the condensation is continuously generated in the lower portion of the boiler is decreased by 25% when compared to a boiler having the same features of the heat exchanger without the internal pipe.

11. The heat exchanger according to claim 1, wherein a time when the condensation is continuously generated in the lower portion of the boiler is decreased by 25% when compared to a boiler having the same features of the heat exchanger without the internal pipe.

12. A heat exchanger of a non-condensing storage type boiler for preventing condensation, the heat exchanger comprising:
   a heating water outflow port installed in an upper portion of the boiler;
   a heating water inflow port installed in a position lower than the heating water outflow port;
   an internal pipe extending spirally from the heating water inflow port and installed in a water tube of the boiler, the internal pipe being connected to an extension pipe that extends through a re-entry outlet passing through a wall of the boiler and the extension pipe being connected with a re-entry inlet;
   the internal pipe being spaced apart from the wall of the boiler by a predetermined distance when installed in the water tube of the boiler; and
   the extension pipe being thermally isolated in order to prevent heating water heat from being emitted outside,
   wherein the internal pipe is subjected to hot-water-based heating by transmission of thermal energy from the water tube of the boiler to the internal pipe, thereby causing a temperature of the re-entry inlet to be higher than a temperature of the heating water inflow port and to be lower than a temperature of the heating water outflow port,
   wherein a quantity of condensate water formed at the lower portion of the boiler is decreased in a first cycle when the boiler is initially driven,
   wherein a time when the condensation is continuously generated in the lower portion of the boiler is decreased by 25% when compared to a boiler having the same features of the heat exchanger without the internal pipe, and
   wherein the thermal energy transmitted from the water tube corresponds to an area A1, which is equal to a thermal energy corresponding to an area A2 which an inflow heating water gets from a heating water in the water tube.

* * * * *

UNITED STATES PATENT AND TRADEMARK OFFICE
CERTIFICATE OF CORRECTION

PATENT NO. : 8,375,898 B2  Page 1 of 1
APPLICATION NO. : 12/307915
DATED : February 19, 2013
INVENTOR(S) : Tae-Sik Min It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1022 days.

Signed and Sealed this
First Day of September, 2015

Michelle K. Lee
*Director of the United States Patent and Trademark Office*